(No Model.)
W. G. STOLZ & C. G. ESHELMAN.
DIFFERENTIAL GEAR FOR BICYCLES.
No. 557,242. Patented Mar. 31, 1896.
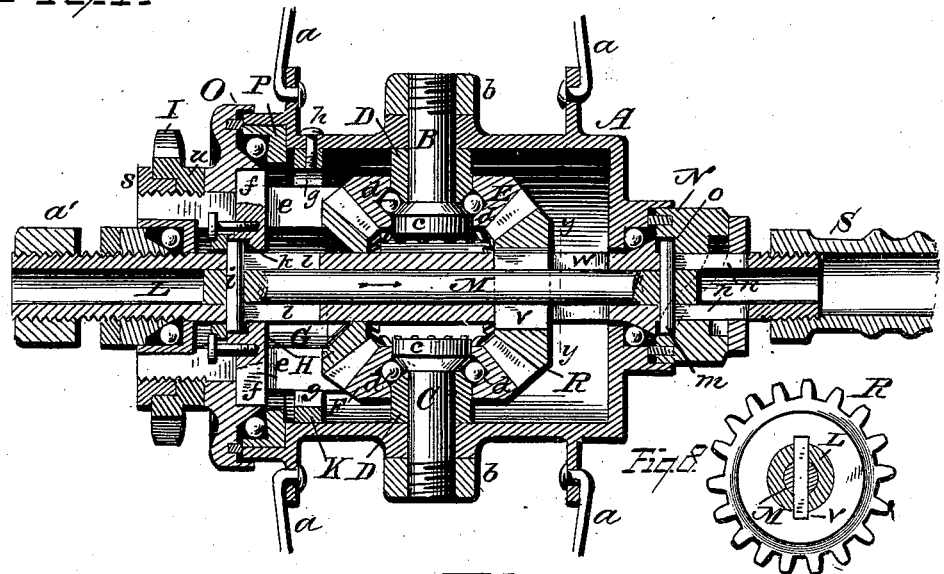
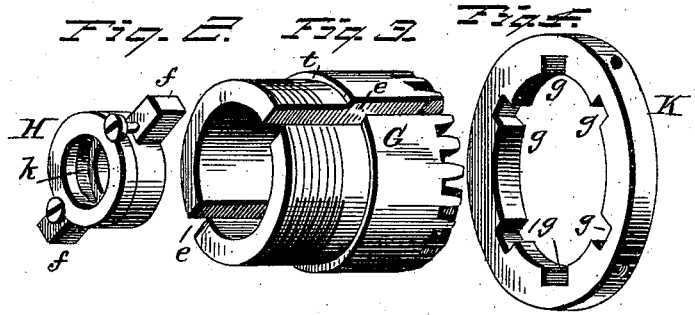
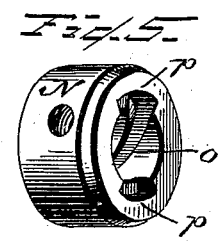
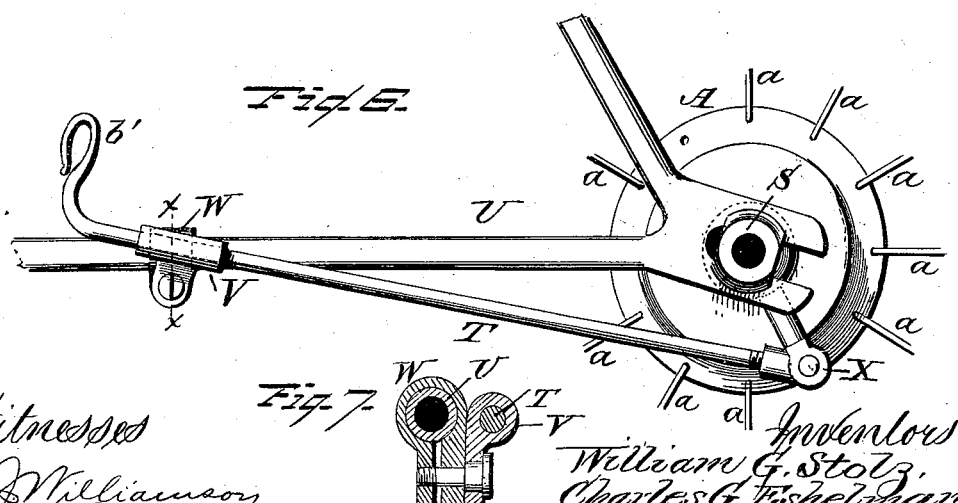
Witnesses
J. J. Williamson
Arne Baker
Inventors
William G. Stolz.
Charles G. Eshelman.
per Chas. H. Fowler
Attorney.

UNITED STATES PATENT OFFICE.

WILLIAM G. STOLZ AND CHARLES G. ESHELMAN, OF READING, PENNSYLVANIA.

DIFFERENTIAL GEAR FOR BICYCLES.

SPECIFICATION forming part of Letters Patent No. 557,242, dated March 31, 1896.

Application filed August 22, 1895. Serial No. 560,142. (No model.)

*To all whom it may concern:*

Be it known that we, WILLIAM G. STOLZ and CHARLES G. ESHELMAN, citizens of the United States, residing at Reading, in the county of Berks and State of Pennsylvania, have invented certain new and useful Improvements in Differential Gear for Bicycles; and we do hereby declare that the following is a full, clear, and exact description of the same, reference being had to the annexed drawings, making a part of this specification, and to the letters of reference marked thereon.

The present invention has relation to that class of differential speed mechanism for bicycles in which means are employed for changing the speed and power of the machine to adapt it to the nature or character of the road over which the machine is propelled without the necessity of the rider dismounting.

The object of the invention is to provide a simple arrangement of differential gearing contained within the hollow hub of the machine and an effective means for operating the gearing to change the speed of the machine, whereby lightness, strength, and durability are secured, in addition to a perfect action of the shifting mechanism, which may be under perfect control of the rider without the necessity of dismounting.

The invention consists in a differential speed mechanism and means for operating it constructed substantially as shown in the drawings and hereinafter described and claimed.

Figure 1 of the drawings is a longitudinal vertical section taken through the center of the hub, the gearing being shown in position to admit the sprocket-wheel making two complete rotations to a single rotation of the hub; Fig. 2, a perspective detail view of the clutch; Fig. 3, a similar view of the gear which connects directly with the sprocket-wheel; Fig. 4, a similar view of the collar which forms a part of the clutch; Fig. 5, a detail perspective view of the cam device; Fig 6, a detail side elevation of the mechanism for operating the differential gearing; Fig. 7, a sectional view taken on line $x$ $x$ of Fig. 6; Fig. 8, a detail sectional view taken on line $y$ $y$ of Fig. 1.

In the accompanying drawings, A represents the hollow hub of a bicycle, having connected thereto in any suitable manner the spokes $a$, which may be of the ordinary construction.

The hub A is formed with openings, which are diametrically opposite each other, to receive bearing-bolts B C, the outer ends of said bolts being screw-threaded to receive screw-threaded nuts $b$ to hold them to the hub. The bolts have heads $c$ upon their inner ends, and between said heads and the interior of the hub are sleeves D, which sleeves are held stationary by frictional contact with the heads of the bolts and the interior of the hub. Upon the bearing-bolts B C are loosely mounted the bevel gear-wheels E F, respectively, which are held thereon by suitable ball-bearings $d$, which bearings may be of any preferred construction.

The wear of the ball-bearings may be taken up, when found necessary, by removing the bolts and the sleeves and shortening the bevel or inner end of said sleeves where said sleeves bear against the under portion of the head of the bolts.

The bevel gear-wheels E F may be of any suitable form and construction and connected to the bearing-bolts in any desirable manner that will be found best adapted to the purpose.

A bevel sleeve-gear G is provided, the teeth of which mesh with the teeth of the two bevel gear-wheels E F at one end of the hub A. This sleeve-gear G has longitudinal slots $e$ diametrically opposite each other to receive the arms $f$ of a slidable clutch H, which clutch is designed to engage the sprocket-wheel I directly with the hub A of the wheel, so that the sprocket-wheel and hub will move together to obtain the highest speed of the machine.

When the clutch H is moved in the direction toward the center of the hub, the arm $f$ will engage with the notches $g$ of a clutch-collar K, which collar is rigidly connected to the interior of the hub by screws $h$ or by any other preferred means, and when the clutch engages therewith the hub and sprocket will move with the same ratio of speed.

A hollow axle L extends through the hub A, and in this axle is located a shifting-rod M, which operates the clutch H through the medium of a pin $i$ engaging with a groove $k$ in the interior of the clutch, as shown more clearly in Fig. 2 of the drawings. The hollow axle L has elongated slots $l$, which are diametrically opposite each other, through which project the ends of the pin $i$, and thereby enable the shifting-rod M to be moved in the hollow axle to shift the gearing in changing the speed. The pin $i$ extends through the end of the rod M and is rigidly secured thereto, and to the opposite end of the rod is a similar pin $m$ secured thereto in like manner, the ends of which project through the slots $n$ in the axle. The extremities of the pin $m$ engage with spiral grooves $o$ of an adjusting device N, which encircles the axle, and by turning said device the shifting-rod M will be operated. These spiral grooves are formed in the interior of the adjusting device, and at the extremity of each groove there is a locking-seat $p$ for the ends of the pin $m$, which seat also forms a stop for the ends of the pin. When the ends of the pin are in position to engage with the seats $p$, the shifting-rod M will be locked in its adjusted position and also the adjustment of the gearing.

The sprocket-wheel I has interior screw-threads for connecting it to the screw-threaded end of the sleeve-gear G, as shown at $r$, and is held thereon by a jam-nut $s$.

A cap O, which closes the open end of the hub A, is held on the sleeve-gear G and against the shoulder $t$ thereof by means of the flange $u$ of the sprocket-wheel, and between the cap and a collar P are suitable ball-bearings of any desired construction. These ball-bearings may be provided wherever found necessary and of any preferred form and construction, and further reference thereto is deemed unnecessary.

A bevel gear-wheel R is rigidly connected to the shifting-rod M by means of a suitable key $v$, the ends of said key projecting through elongated slots $w$ in the axle L, which slots are diametrically opposite each other, as shown in Fig. 1 of the drawings. This bevel gear-wheel R is carried along with the shifting-rod M when said rod is moved lengthwise and is held from rotating by the key which connects it to the rod. The hollow axle L remains stationary while the hub revolves thereon through the medium of the sprocket wheel and chain commonly employed as a driving power, the ends of the axle being screw-threaded to receive, respectively, the nut $a'$ to secure the hub to the frame of the machine and the usual step S, which also acts as a nut for a similar purpose.

The adjusting device N is controlled and operated by a lever T, which is held to the frame U of the machine by the bearing-sleeve V, which is suitably attached to a clip W secured to one of the arms of the frame. One end of the lever T is suitably bent or formed in such manner as to present suitable means by which the lever may be operated by the foot of the rider without dismounting from the machine, as shown at $b'$ in Fig. 6 of the drawings. The opposite end of the lever T has pivotally connected to it in any suitable and convenient manner a crank X, and this crank is connected to the adjusting device N.

By means of the lever-and-crank connection the adjusting device will be turned upon its axis and operate the shifting-rod M to change the speed of the gearing.

When the parts are in position shown in Fig. 1, the sprocket-wheel I will make two revolutions to one revolution of the hub A, thus reducing the speed one-half and doubling the power, the gearing E, F, G, and R engaging each other and the clutch H being out of engagement with the clutch-collar K.

When it is desired to increase the speed, the adjusting device N is turned upon its axis by means of the lever hereinbefore described, and the pin $m$, which engages with the spiral grooves $o$ in said adjusting device, will cause the shifting-rod M to be drawn in the direction of the arrow shown in Fig. 1 of the drawings. This motion of the rod will bring the clutch H in engagement with the clutch-collar K and simultaneously bring the gear-wheel R out of engagement with the gear-wheels E and F, thus enabling them to revolve around with the hub without revolving upon their axis.

As previously stated, the ball-bearings may be variously modified or changed as circumstances require, as may also the various details of construction, and any changes or modifications as would come within ordinary mechanical skill may be made without departing from the principle of the invention.

Having now fully described our invention, what we claim as new, and desire to secure by Letters Patent, is—

1. A differential gear for bicycles, consisting of a hollow hub, bevel gear-wheels located therein and mounted upon short bolts extending into the hub, a sprocket-wheel, a sleeve-gear connecting therewith and engaging with the bevel gear-wheels, a hollow axle extending through the hub, a shifting-rod located in the axle, a clutch device connecting with the rod and adapted to engage the hub with the sprocket-wheel, a bevel gear-wheel connected to the shifting-rod and moving therewith and adapted to engage the bevel gear-wheels upon the bearing-bolts, and means for operating the rod, substantially as and for the purpose set forth.

2. A differential gear for bicycles, consisting of a suitable hub, bevel gear-wheels mounted upon bearing-bolts located in the hub, a sprocket-wheel and a slotted sleeve-gear connected together, said gear engaging the bevel gear-wheels on the bearing-bolts, a hollow axle extending through the hub, a shifting-rod located in the axle, a clutch secured to the rod and moving longitudinally therewith, arms upon the clutch extending through the slots in the sleeve-gear and adapted to engage with notches in a clutch-collar secured to the hub, a bevel gear-wheel secured to the shifting-rod and moving therewith and adapted to engage with the bevel gear-wheels on the bearing-bolts, and means for operating the rod, substantially as and for the purpose specified.

3. A differential gear for bicycles, consisting of bevel gear-wheels located within a hollow hub and supported upon short bearing-bolts, a sprocket-wheel and a sleeve-gear connected together, said gear engaging with the bevel gear-wheels, a slotted hollow axle extending through the hub, a clutch device thereon adapted to engage the sprocket-wheel with the hub, a slidable shifting-rod to which said clutch device is connected, and means for operating the shifting-rod, consisting of an adjusting device having interior spiral grooves with locking-seats at their extremities, and a pin secured to the shifting-rod, extending through elongated slots in the axle and engaging the grooves of the adjusting device, substantially as and for the purpose set forth.

4. A differential gear for bicycles, consisting of a suitable hub and bevel gear-wheels therein mounted upon suitable bearing-bolts, a sprocket-wheel and sleeve-gear connected together, said gear engaging with the bevel gear-wheels, a hollow axle extending through the hub, a shifting-rod located in the axle, a clutch device and a bevel gear-wheel connected to the rod and moving therewith, an adjusting device for operating the rod having interior spiral grooves with locking-seats at their extremities, a pin secured to the rod and engaging the grooves, and a lever and crank connecting with the adjusting device adapted to be operated by the foot of the rider, substantially as and for the purpose described.

In testimony that we claim the above we have hereunto subscribed our names in the presence of two witnesses.

WILLIAM G. STOLZ.
CHARLES G. ESHELMAN.

Witnesses:
ALEX. S. STEUART,
GEO. M. COPENHAVER.